3,324,144
PROCESS FOR PREPARING FLUORINATED
DIOXOLANES
David G. Coe, Mendenhall, Pa., and Dexter B. Pattison, Wilmington, Del., assignors to E. I. du Pont de Nemours and Company, Wilmington, Del., a corporation of Delaware
No Drawing. Filed Mar. 11, 1964, Ser. No. 351,208
15 Claims. (Cl. 260—340.9)

This invention is concerned with a process for preparing 2,2-bis(polyfluoroalkyl)-1,3-dioxolanes by reaction of certain polyfluorinated ketones with certain epoxides in the presence of selected catalysts.

Simmons, in U.S. Patent, 2,925,424, has described a process for preparing 2,2-bis(polyfluoroalkyl)-1,3-dioxolanes by reaction of polyfluorinated ketones with halohydrines (i.e. haloalcohols having the halogen and hydroxyl on adjacent carbons) in the presence of bases such as alkali metal carbonates. While this process is useful within its scope, it is limited to the use of halohydrines which are free of substituents which would react with bases. In addition, anhydrous conditions are required due to the very sensitive nature of polyfluorinated ketones toward bases in the presence of water. Since most polyfluorinated ketones are also hygroscopic and difficult to keep dry, it is difficult to prevent some loss of ketone in the presence of base by such process.

Bogert and Roblin, J. Amer. Chem. Soc., 55, 3741 (1933), disclose the reaction of hydrocarbon ketones with epoxides in the presence of stannic chloride to form 1,3-dioxolanes. However, stannic chloride is not useful in causing polyfluorinated ketones to react with epoxides to form 1,3-dioxolanes. Polymerization seems to occur instead.

Bersin and Willfang, Ber., 70, 2167 (1937), is similar to Bogert and Roblin above, but also discloses the use of aluminum, iron, antimony, boron and other similar halides as catalysts. None of these materials are useful in the process of this invention. None of the useful catalysts of this invention are disclosed by Bersin and Willfang.

It is an object of this invention to provide a novel and improved process for preparing 2,2-bis(polyfluoroalkyl)-1,3-dioxolanes. Another object is to provide a process of such character which does not involve the use of bases or require anhydrous conditions and which avoids the formation of polymers. A further object is to provide a process which results in high conversions of the reactants to the desired dioxolanes and which is simple, easy and economical to operate. Other objects are to advance the art. Still other objects will appear hereinafter.

The above and other objects are accomplished according to this invention by the process which comprises reacting, at a temperature in the range of from about 21° C. to about 200° C., (a) a polyfluoro-ketone of 3 to 21 carbon atoms having the formula $R_xCXF—CO—CYFR_y$ wherein each of X and Y is a halogen atom of atomic numbers 9–17, and $R_x$ and $R_y$ is a member of the group consisting, separately, of F, Cl, perfluoroalkyl groups of 1–10 carbon atoms, and ω-hydroperfluoroalkyl groups of 1–10 carbon atoms, and, jointly, of polyfluoroalkylene and oxopolyfluoroalkylene groups of 1–3 carbon atoms which form with the —CXF—CO—CYF— group a carbocyclic ring of 4–6 carbon atoms;

(b) with an epoxide of 2 to 20 carbon atoms having the formula

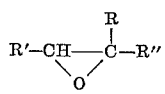

wherein one of R' and R" is hydrogen and the other is a member of the group consisting of hydrogen, alkyl, alkenyl, carboxyl, carbalkoxyl, cyano, acyl, substituted alkyl and substituted alkenyl groups, the substituents in said substituted groups being selected from halogen, carboxyl, carbalkoxyl, cyano, hydroxyl, alkoxyl, acyl, acyloxy, and dialkylamine groups; and R is a separate member of the group consisting of phenyl, epoxyalkyl, and the groups defining the other of R' and R";

(c) in the presence of a catalytic amount of a catalyst of the group consisting of lithium chloride, alkali metal halides in which the halogens are of atomic numbers 35–53, and quaternary ammonium halides in which the halogens are of atomic numbers 35–53 and the quarternary ammonium cations are selected from tetraalkylammonium and aralkyltrialkylammonium cations.

A further feature of this invention comprises carrying out the above process in the presence of at least 0.2 part by weight of a polar liquid of the group consisting of water, alkanols of 1–4 carbon atoms, and alkylene glycols of 2–4 carbon atoms, for each part of catalyst (c).

The process of this invention involves the reaction represented by the following equation:

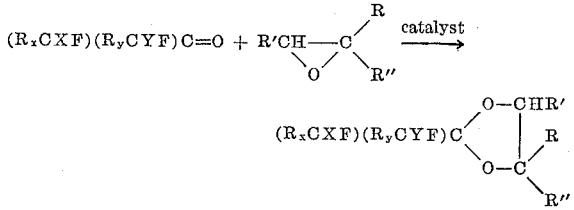

By employing in this process a catalyst of the group defined in (c) above with the defined classes of ketones and epoxides, 2,2-bis(polyfluoroalkyl)-1,3-dioxolanes are obtained without the formation of polymeric products, whereby the dioxolanes can be readily recovered from the reaction mixtures in pure form. Also, there are obtained high conversions of the reactants to dioxolanes in high yields. Since the process does not involve the use of basic catalysts and does not require anhydrous conditions, it permits the use of reactants which could not be used with basic catalysts and of hygroscopic reactants without the necessity of first rendering such reactants anhydrous and maintaining them in that condition. It has been found further that small amounts of polar liquids, such as water, lower alkanols and lower glycols, accelerate the reaction to a considerable extent, usually almost doubling the reaction rate, without changing the nature or course of the reaction.

The process is carried out by mixing together the polyfluorinated ketone, the epoxide and the catalyst in a reaction vessel and maintaining the mixture at the desired reaction temperature until the reaction is complete. The two reactants, the ketones and the epoxides, may be used in any desired proportions. Reaction will take place as long as both reactants are present. If either reactant is present in excess, conversion of the two reactants continues until approximately all of that present in the lesser amount is consumed. It is usually desirable to obtain as complete conversion of both reactants as possible, since it simplifies recovery and purification of the desired products. Therefore, since the two reactants combine on an equimolar basis, it is usually preferable to use approximately equimolar amounts of the two reactants.

Reaction solvents are optional and need not be used if either reactant is a liquid or can be maintained in the liquid state under the reaction conditions. Inert polar solvents may be used however and are particularly useful when the reactants or products are solids. Useful solvents include perfluoroethers, such as perfluoro-n- butyloxolane; lower alcohols, such as methanol and ethanol; and lower glycols, such as ethylene glycol. Solvents which would react with either the polyfluoroketone or the epoxide should be avoided. Water, for example, cannot be tolerated in large amounts. Preferably, solvents are avoided, if not required, because they must be removed from the products later.

The reaction temperature required depends on the polyfluorinated ketone, the epoxide and the catalyst being used. When either or both of the polyfluorinated ketone or the epoxide contain bulky groups attached to the group undergoing reaction, the reaction rate is slower than usual. Under such circumstances, either a higher reaction temperature, a more active catalyst, or both is desirable. With very reactive ketones, such as hexafluoroacetone, reactive epoxides, such as ethylene oxide, and active catalysts, such as tetra-n-butylammonium iodide, a convenient reaction rate is obtained at room temperature, about 21° C. for most combinations of polyfluorinated ketones, epoxides an dcatalysts, a reaction temperature in excess of 100° C. is more useful. In general, 120° C. has been found to be most generally useful and is the preferred reaction temperature. Temperatures up to 200° C. may be used but are seldom required.

When both the reactants are gases under the reaction conditions, the use of a sealed system is desirable. Refrigerated condensers may be used, when one of the reactants is liquid under the reaction conditions and the other reactant has a boiling point below room temperature, to retain the lower boiling material in the reaction system. Sealed systems are also useful with such combinations. When both reactants and products are liquids, ordinary reaction systems are most useful.

The reaction is usually aided by agitation, but agitation is not required. Likewise, it is usually convenient to protect the system from the atmosphere, but it is not necessary to do so.

Only a small amount of the catalyst is required in the present process (a catalytic amount). One part catalyst per 100 to 300 parts of reactants has been found suitable. The amount of catalyst used, as well as the nature of the catalyst, has an effect on the reaction rate. Hence the reaction rate may be adjusted somewhat by variation of the concentration of catalyst. The catalyst concentration is of lesser importance than the catalyst composition in determining reaction rate. The optimum catalyst and catalyst concentration for a particular reactant pair is best determined experimentally.

The catalyst is chosen from lithium chloride; alkali metal bromides including lithium, sodium, potassium, rubidium and cesium bromides; alkali metal iodides including lithium, sodium, potassium, rubidium and cesium iodides; tetraalkylammonium bromides and iodides; and aralkyltrialkylammonium bromides and iodides. The quaternary ammonium cation of the quaternary ammonium halides includes such species as tetramethylammonium, tetraethylammonium, tetrapropylammonium, tetrabutylammonium, hexyltrimethylammonium, octyltrimethylammonium, decyltrimethylammonium, dodecyltrimethylammonium, hexadecyltriethylammonium, octadecyltrimethylammonium, benzyltrimethylammonium, hexadecylethyldimethylammonium, didodecyldimethylammonium and dioctadecyldimethylammonium groups. Many of the quaternary ammonium salts are commercially available, particularly the mixed tetraalkylammonium compounds of structure

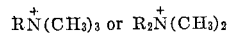

wherein R is a straight chain alkyl group of 12–18 carbons. The nature of the alkyl groups does not seem to have a controlling effect on the catalytic activity. The alkali metal bromides and iodides listed above are also commercially available.

Of the group of catalysts listed above, the bromides and iodides are the more active. The quaternary ammonium halides in which the halogen is of atomic numbers 35–53 are particularly active and preferred. The tetraalkylammonium iodides appear to be the most active catalysts available. Tetra-n-butylammonium iodide is the preferred catalyst. The iodides may decompose slightly to form iodine.

The solubility of the catalysts in the reaction mass appears to be important. Soluble catalysts seem to be more active. This is probably the cause of the greater activity of the quaternary ammonium halides, since they are usually somewhat more soluble in the reaction mass than the alkali metal halides. It is not an absolute requirement that the catalysts be soluble in the reaction mass however, as the polymeric quaternary ammonium ion exchange resins in which the anion is a halogen of atomic numbers 35–53 and the cation is composed of the repeating unit

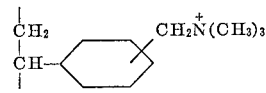

are useful catalysts in the present process.

Alkali metal chlorides, other than lithium chloride; alkali metal sulfates, nitrates, cyanides and fluorides; and quaternary ammonium chlorides are not useful with the defined reactants in the present invention because they cause polymerization as well as dioxolane formation under the defined reaction conditions. The halides of polyvalent metals, such as aluminum, iron, tin, and the like, are not useful with the defined reactants in the present invention, since they catalyze polymerization entirely under the defined reaction conditions. The catalysts of this invention, as defined above, catalyze only the formation of dioxolanes under the defined reaction conditions with the defined reactants.

The catalysts, except the ion exchange resins, are usually added to the reaction mass (or system) in the form of finely divided solids. The catalysts should be reasonably, preferably essentially, pure, except for small amounts of adsorbed water. The commercially pure forms of these catalysts are usually acceptable.

When cationic ion exchange resins in the bromide or iodide form are used as the catalysts in the present process, a mixture of the polyfluorinated ketone and epoxide may be flowed over the resin. Reaction occurs on the resin and the product 1,3-dioxolane flows off of the resin. The mixture of reactants may be either gaseous or liquid. Normally solid reactants may be dissolved in an inert solvent and the solution passed over the resin.

Ion exchange resins usually contain water. If used at elevated temperatures, water is lost slowly. Catalytic activity seems to decrease with the loss of water. As is well known in the art, heating completely dehydrated ion exchange resins usually leads to resin degradation. Such degradation can be avoided and the catalytic activity can be restored by periodically treating the resin with water or maintained by introducing a small amount of water, sufficient to replace that lost by heat, with the reactants so as to maintain the resin in the desired hydrated state.

Ion exchange resins of the quaternary ammonium type, in the bromide or iodide form, form the basis of a useful continuous process for preparing 1,3-dioxolanes according to the present process. In the continuous process, a mixture of the reactants is continuously flowed into a bed or column of resin. The product, as it forms, flows through and out of the resin bed or column. Since the catalyst does not need to be separated from the product, it is then merely necessary to condense or collect the product stream and introduce it into a continuous distillation apparatus where the desired product is separated from unreacted starting materials. The recovered starting materials may then be recycled if desired.

The ketone reactant is a polyfluoro-ketone of 3 to 21 carbon atoms having the formula $R_xCXF—CO—CYFR_y$ wherein each of X and Y is a halogen atom of atomic numbers 9–17, and $R_x$ and $R_y$ is a member of the group consisting, separately, of F, Cl, perfluoroalkyl groups of 1–10 carbon atoms, and ω-hydroperfluoroalkyl groups of 1–10 carbon atoms, and, jointly, of polyfluoroalkylene and oxopolyfluoroalkylene groups of 1–3 carbon atoms which form with the —CXF—CO—CYF— group a carbocyclic ring of 4–6 carbon atoms. Such rings may carry polyfluoroalkyl substituents attached thereto.

Typical examples of useful ketones are: $CF_3COCF_3$;

$CF_2ClCOCF_3$; $CF_2ClCOCF_2Cl$; $CFCl_2COCF_3$
$CFCl_2COCFCl_2$; $CFCl_2COCF_2Cl$; $CF_3CF_2COCF_3$
$CF_3(CF_2)_2CF_2COCF_3$; $CF_3(CF_2)_4CF_2COCF_3$
$CF_3CF_2COCF_2CF_3$; $CF_3(CF_2)_2CF_2COCF_2CF_3$
$CF_3(CF_2)_2CF_2COCF_2(CF_2)_2CF_3$
$CF_3(CF_2)_4CF_2COCF_2CF_3$
$CF_3(CF_2)_4CF_2COCF_2(CF_2)_2CF_3$
$CF_3(CF_2)_4CF_2COCF_2(CF_2)_4CF_3$; $H(CF_2)_2COCF_3$
$H(CF_2)_4COCF_3$; $H(CF_2)_6COCF_3$; $H(CF_2)_2CO(CF_2)_2H$
$H(CF_2)_4CO(CF_2)_2H$; $H(CF_2)_4CO(CF_2)_4H$
$H(CF_2)_6CO(CF_2)_2H$
$H(CF_2)_6CO(CF_2)_4H$; $H(CF_2)_6CO(CF_2)_6H$

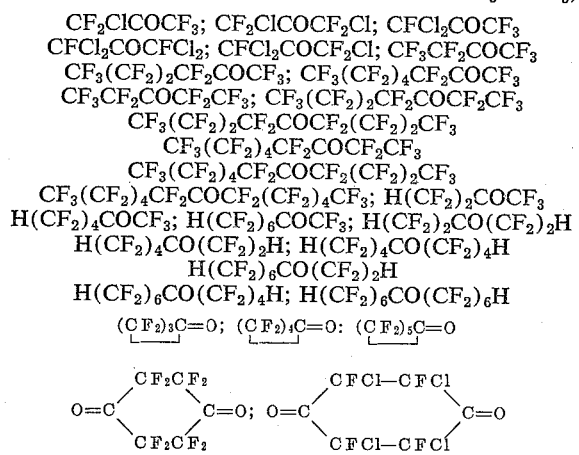

and the like.

The ketones are limited to those containing a maximum of about twenty-one carbons by reactivity, ketones containing more than about twenty-one carbons being of very sluggish reactivity. The reactivity of the ketones in general decreases with increasing size of the groups attached to the carbonyl group. Hexafluoroacetone is the most reactive. It is essential that each carbon adjacent to the carbonyl group of the ketone (the α-carbons) have at most one substituent other than halogen attached thereto, i.e., there are at least 2 halogen atoms on each α-carbon atom. For example, while a ketone such as $$CF_3CF_2—CO—CF_2CF_3$$

is quite useful in the present process, the ketone $$(CF_3)_2CF—CO—CF(CF_3)_2$$

is quite unreactive. It is also essential that at least one of the halogen atoms on each α-carbon be fluorine.

Particularly desirable ketones are the saturated perhalocarbon and ω-hydroperhalocarbon monoketones of 3 to 21 carbon atoms, preferably 3 to 8 carbon atoms, in which there are at least 2 halogen atoms on each α-carbon atom at least one of which is fluorine and in which at least 50% of all halogen atoms are fluorine and the rest are chlorine. These include, as preferred classes, (1) the saturated perfluorocarbon monoketones of 3 to 8 carbon atoms in which there are at least 2 fluorine atoms on each α-carbon atom; and (2) the saturated ω-hydroperfluorocarbon monoketones of 3 to 8 carbon atoms in which there are at least 2 fluorine atoms on each α-carbon atom.

The epoxide starting materials used in this invention have the general structure

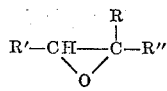

wherein one of R' and R" is hydrogen and the other is a member of the group consisting of hydrogen, alkyl, alkenyl, carboxyl, carbalkoxy, cyano, acyl, substituted alkyl and substituted alkenyl groups, the substituents in said substituted groups being selected from halogen, carboxyl, carbalkoxyl, cyano, hydroxyl, alkoxyl, acyl, acyloxy, and dialkylamine groups; and R is a separate member of the group consisting of phenyl, epoxyalkyl, and the groups defining the other of R' and R". If R, R' and R" are all groups other than hydrogen, the epoxide will not react with polyfluoroketones to form the desired 1,3-dioxolanes in the present process. The reactivity of the epoxides depends on the nature of the substituents R, R' and R". As the bulk of these groups is increased, the reactivity decreases. It is preferable therefore to use the most active catalysts with the bulky epoxides.

The nature of the substituent on the epoxide is important only if it interferes with the reaction with the polyfluorinate ketone in some manner. The polyfluorinated ketones are very reactive in particular toward mercapto groups and such groups should be avoided. In general, other substituents do not interfere. The presence of olefinic unsaturation in the substituents does not interfere, for example, butadiene monoepoxide is a useful reactant.

Epoxides of cyclic olefines such as cyclohexene epoxide, i.e., wherein the carbon atoms of the epoxy group,

form part of a carbocyclic ring, are not useful in the present process. The reason for this is not well established but is thought to be due to certain molecular spacial requirements of the reaction not provided by the cyclic epoxides. Therefore, each carbon atom of each epoxy group must form part of an acyclic carbon chain, excepting the epoxy

ring. It is not intended that the present process be limited to any particular concept of reaction mechanism however.

Preferred epoxide reactants are those wherein R' or R" are hydrogen, alkyl, particularly methyl, alkenyl, haloalkyl, particularly halomethyl, and wherein R is hydrogen, alkyl, phenyl, epoxyalkyl, haloalkyl, particularly halomethyl, carbalkoxyalkyl and hydroxyalkyl. Particularly suitable and preferred classes of epoxides are (1) alkylene oxides of 2 to 20 carbon atoms, most preferably 2 to 4 carbon atoms, and 1 to 2 epoxy groups in which the 2 carbon atoms of each epoxy group together carry at least 2 hydrogen atoms and each carbon atom of each epoxy group forms part of an acyclic carbon chain; and (2) substituted alkylene oxides of 2 to 20 carbon atoms, most preferably 2 to 4 carbon atoms, and 1 to 2 epoxy groups in which the 2 carbon atoms of each epoxy group together carry at least 2 hydrogen atoms and each carbon atom of each epoxy group forms part of an acyclic carbon chain, and the substituents consist of 1 to 2 haloalkyl groups; usually halomethyl, and especially monochloroalkyl and monochloromethyl. The 2 hydrogen atoms of the epoxy groups may be on the same or different epoxy carbon atoms. It will be understood that the term "alkylene oxide" as used herein (except where otherwise indicated) is used in its usual sense to mean a compound which, except for the epoxy oxygens, consists of carbon and hydrogen, i.e. is unsubstituted.

Some examples of useful epoxides are

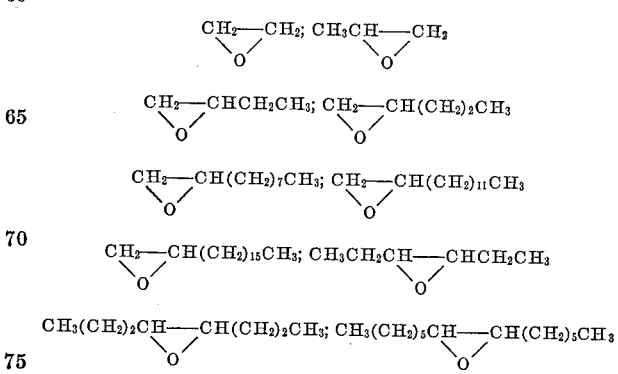

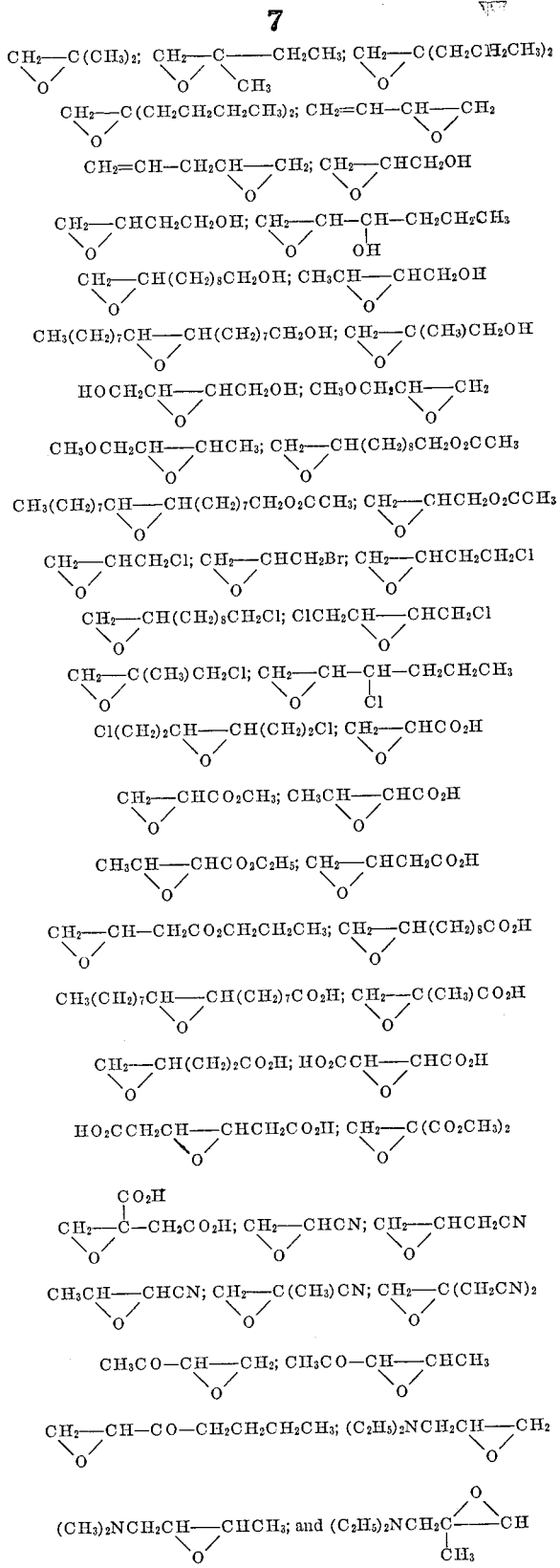

Preferred members of the above group are

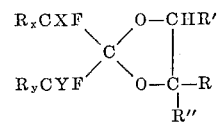

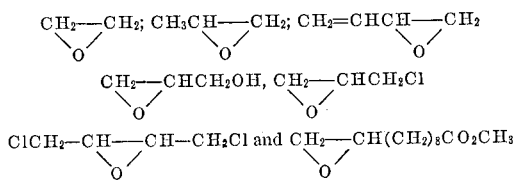

A small amount of a polar liquid, such as water, an alkanol of 1–4 carbon atoms or an alkylene glycol of 2–4 carbon atoms is desirable in the reaction mixture. The amount used is insufficient to be considered a reaction solvent, it being more or less equivalent in weight to the weight of catalyst. Generally, the weight ratio of polar liquid used to the catalyst is from about 0.2 to about 1 part by weight for each part of catalyst. The presence of this small amount of polar liquid accelerates the reaction. When water is used as the polar liquid, it generally should not exceed about 1 part per part of catalyst. Much larger amounts of the alkanols and the glycols can be used, in which case, the excess functions as an inert solvent. The alcohol or glycol used should be water soluble. Methanol is the preferred alcohol, ethylene glycol the preferred glycol. Water is preferred to an alcohol or a glycol.

The products of this process, if liquid, are usually isolated by merely distilling the reaction mixture. In this manner, both the desired products and the unreacted starting materials are recovered. The catalyst remains behind, and may be recovered for reuse if so desired. Most of the catalysts are sufficiently inexpensive to make recovery uneconomical however. Solid products which cannot be distilled are recovered by simple recrystallization or solvent extraction to remove catalyst and starting materials.

The products of the process of this invention are 2,2-bis(polyfluoroalkyl)-1,3-dioxolanes of the structure $$\begin{array}{c} R_xCXF \\ \diagdown \\ R_yCYF \end{array} \begin{array}{c} C \\ \diagup \\ \diagdown \end{array} \begin{array}{c} O-CHR' \\ | \\ O-C-R \\ | \\ R'' \end{array}$$

These products are liquids or solids which are easily isolated and purified by distillation or recrystallization. Many are known to the art. Those which contain no functional groups are useful as stable heat exchange fluids, hydraulic fluids, dielectric media, and the like (i.e., those where R, R' and R'' are hydrogen or an alkyl group). When R, R' or R'' contains an olefinic group or a functional group such as halogen, hydroxyl, carboxyl, carbalkoxyl, cyano or dialkyl amino, the products are also useful as intermediates for the production of other valuable products, such as polymers, polymerizable olefinic compounds (cf. Example 17), and derivatives formed in known manner by reaction of the functional groups.

Also, the products, except those containing free carboxyl groups (not esters), are dielectrics and are useful in devices such as those described by Camilli in U.S. Patent 3,073,885; Hill in U.S. Patent 2,561,737 and 2,561,738; and Narbutvoskih in U.S. Patents 2,711,882; 2,759,987; 2,844,523 and 2,845,472. The products containing free carboxyl groups are useful in the form of their alkali metal salts as surface active agents.

In order to more fully illustrate this invention, preferred modes of practicing it, and advantageous results obtained thereby, the following examples are given in which the parts and proportions are by weight, except where specifically indicated otherwise.

*Example 1*

Lithium chloride (0.5 part) which had been dried at 130° C. for 24 hours, was placed in a Hastelloy C lined shaker tube. The tube was cooled to −50° C., evacuated and 110 parts hexafluoroacetone and 29 parts ethylene oxide were added. The tube was then sealed and heated at 120° C. for 12 hours (the pressure within the tube had decreased to atmospheric pressure after 6 hours). After cooling, the tube was discharged and the contents distilled to give a 90% yield of 2,2-bis(trifluoromethyl)-1,3-dioxolane, B.P. 103–105° C.

Example 2

Example 1 was repeated except that the lithium chloride was not dried and 0.5 part water was added to the reaction vessel. The pressure within the vessel decreased to atmospheric pressure in 3 hours at 120° C. Discharge of the vessel after 12 hours and distillation of the product gave 2,2-bis(trifluoromethyl)-1,3-dioxolane in 90% yield, B.P. 103–105° C.

Example 3

Lithium bromide (0.5 part) and water (0.1 part) were placed in a Hastelloy C lined shaker tube. The tube was cooled to −50° C., evacuated and 110 parts hexafluoroacetone and 29 parts ethylene oxide were added. The tube was sealed and heated at 120° C. for 12 hours (the pressure decreased to atmospheric in 35 minutes). After cooling, the product was discharged and distilled, giving 2,2-bis(trifluoromethyl)-1,3-dioxolane in 94% yield.

Example 4

Lithium iodide (0.5 part) and water (0.1 part) were placed in a Hastelloy C lined shaker tube. The tube was cooled to −50° C. and 110 parts hexafluoroacetone and 29 parts ethylene oxide were added. The tube was then sealed and heated at 120° C. for 12 hours (pressure atmospheric in 2 hours). After cooling, the product was discharged and distilled, giving 2,2-bis(trifluoromethyl)-1,3-dioxolane in 95% yield.

Example 5

Sodium bromide (0.5 part) and water (0.1 part) were placed in a Hastelloy C lined shaker tube. The tube was cooled to −50° C., evacuated and 110 parts hexafluoroacetone and 29 parts ethylene oxide were added. The tube was then sealed and heated at 120° C. for 12 hours (pressure atmospheric after 9.5 hours). After cooling, the tube was discharged and the product distilled, giving 2,2-bis(trifluoromethyl)-1,3-dioxolane in 86% yield.

Example 6

Potassium iodide (0.5 part) and water (0.1 part) were placed in a Hastelloy C lined shaker tube. The tube was cooled to −50° C. and 110 parts hexafluoroacetone and 29 parts ethylene oxide were added. The tube was then sealed and heated at 120° C. for 12 hours (pressure atmospheric after 5.5 hours). After cooling, the product was discharged and distilled, giving 2,2-bis(trifluoromethyl)-1,3-dioxolane in 100% yield.

Example 7

A Pyrex reactor was charged with 3 ml. (0.03 mole) of hexafluoroacetone, 1.4 ml. (0.03 mole) of ethylene oxide, and 50 mg. of tetrapropylammonium bromide at −78° C. The reactor was sealed and maintained at 25° C. for three days. The reactor was then opened and 5 g. (81% yield) of 2,2-bis(perfluoromethyl)-1,3-dioxolane was obtained, boiling at 105° C.

Example 8

Tetra-n-butylammonium bromide (0.5 part) and water (0.1 part) were placed in a Hastelloy C lined shaker tube. The tube was cooled to −50° C., evacuated and 110 parts hexafluoroacetone and 29 parts ethylene oxide were added. The tube was then sealed and heated at 110° C. for 12 hours (pressure atmospheric in 25 minutes). After cooling, the product was discharged and distilled, giving 2,2-bis(trifluoromethyl)-1,3-dioxolane in 110% yield.

Example 9

Cetylethyldimethylammonium bromide (0.5 part) and water (0.1 part) were placed in a Hastelloy C lined shaker tube. The tube was cooled to −50° C., evacuated and 110 parts hexafluoroacetone and 29 parts ethylene oxide were added. The tube was then sealed and heated at 120° C. for 12 hours (pressure atmospheric in 2 hours). After cooling, the product was discharged and distilled, giving 2,2-bis(trifluoromethyl)-1,3-dioxolane in 97% yield.

Example 10

"Amberlite" 400 ion exchange resin in the commercial chloride form was washed with 20% aqueous caustic until the washings were free of chloride ion. Then the resin was washed with a concentrated solution of ammonium bromide until the washings were free of base. A vertical, 12-inch tube was filled with the ion exchange resin in the bromide form thus obtained and was heated to 120° C. A mixture of approximately equimolar amounts of hexafluoroacetone and ethylene oxide vapors were passed down the column for several hours. The off-gases from the column were condensed and found to be 2,2-bis(trifluoromethyl)-1,3-dioxolane, apparently in 100% yield. The efficiency of the resin as a catalyst decreased with time due to dehydration of the solid resin. Periodic rehydration restores the activity.

"Amberlite" 400 is a cationic ion exchange resin manufactured by Rohm and Haas Co. It is a substituted styrene resin containing the repating unit

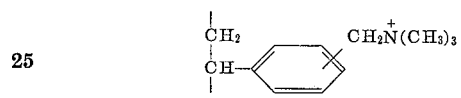

In the example, the anion was Br−.

Example 11

A mixture of 1.5 parts "Amberlite" 400 ion exchange resin in the bromide form and 0.1 part of water was placed in a shaker tube. The tube was sealed, cooled to −80° C., evacuated and 110 parts hexafluoroacetone and 29 parts ethylene oxide were added. The tube was resealed and heated at 120° C. for 12 hours. After cooling the product was discharged and distilled giving a 99% yield of 2,2-bis(trifluoromethyl)-1,3-dioxolane.

Example 12

1,4-dichloro-2,3-epoxybutane (70.4 parts), 0.1 part water and 0.5 part tetra-n-butylammonium iodide were placed in a shaker tube. The tube was cooled to −50° C., evacuated and 83 parts hexafluoroacetone were added. The tube was then sealed and heated at 120° C. for 12 hours. After cooling, the product was discharged and distilled, giving 123 parts (80%) of 2,2-bis(trifluoromethyl)-4,5-bis(chloromethyl)21,3-dioxolane, B.P. 56° C. at 2.7 mm. Hg pressure, $n_D^{25}$ 1.3863.

*Analysis.*—Calcd. for $C_7H_6F_6Cl_2O_2$: C, 27.4; H, 1.95; F, 37.2; Cl, 23.1. Found: C, 27.6; H, 2.1; F, 37.5; Cl, 23.6.

This product can be dehydrochlorinated to 2,2-bis(trifluoromethyl)-4,5 - bis(methylene)-1,3 - dioxolane which can be polymerized.

Example 13

Butadiene diepoxide (28.5 parts) and tetra-n-butylammonium iodide (0.5 part) were placed in a shaker tube which was then cooled to −50° C. and evacuated. Hexafluoroacetone (55 parts, one equivalent) was added. The tube was then sealed and heated at 120° C. for 12 hours. After cooling, the product was discharged and distilled, giving 37.9 parts (47% conversion) of a mixture of 2,2-bis(trifluoromethyl) - 4 - (1′,2′ - epoxyethyl) - 1,3 - dioxolane (I) and 2,2,2′,2′-tetrakis(trifluoromethyl)-4,4′-bis(1,3-dioxolane) (II).

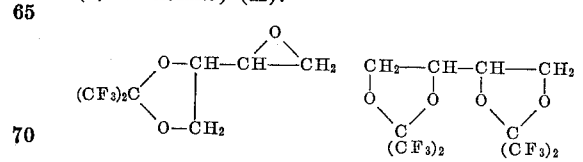

Redistillation of the mixture gave 10.5 parts (26.5% yield) of compound (II), B.P. 670 C./2.2 mm., $n_D^{25}$ 1.3216.

*Analysis.*—Calcd. for $C_{10}H_6F_{12}O_4$: C, 28.7; H, 1.44; F, 54.6; mole weight, 418. Found: C, 28.6; H, 1.7; F, 55.0; mole weight, 440.

The presence of compound (I) in a lower boiling fraction of the distillate was confirmed by time of flight mass spectography. Compound (I) may be polymerized.

Example 14

1,7-dihydrododecafluoroheptan-3-one (99.9 parts), 0.5 part tetra-n-butylammonium iodide and 0.4 part methanol were heated under reflux while ethylene oxide was passed into the reaction mixture until 13.2 parts had been added and adsorbed, about 4 hours. The product was then distilled, giving 80 parts of crude product. Redistillation gave 75 parts (65%) of 2-(4'-hydrooctafluorobutyl)-2-(2'-hydrotetrafluoroethyl)-1,3-dioxolane

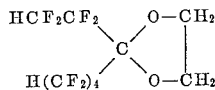

of boiling point 111° C./13 mm., $n_D^{25}$ 1.3399.

*Analysis.*—Calcd. for $C_9H_6F_{12}O_2$: C, 28.9; H, 1.6; F, 60.9. Found: C, 28.9; H, 1.6; F, 62.9.

Example 15

A mixture of 30 parts styrene epoxide, 0.5 part lithium bromide, 41.5 parts hexafluoroacetone and 26.5 parts ethylene glycol was heated under a refrigerated condenser at 100° C. for 3 hours. The mixture was then cooled, washed with water, taken up in ether, washed with water again, dried and distilled, giving 22 parts (31%) of 2,2-bis(trifluoromethyl)-4 - phenyl - 1,3 - dioxolane, B.P. 44° C./0.3 mm., $n_D^{25}$ 1.4179.

*Analysis.*—Calcd. for $C_{11}H_8F_6O_2$: C, 46.2; H, 2.8; F, 39.9. Found: C, 46.3; H, 2.8; F, 39.9.

Example 16

A mixture of 0.1 part water, 0.5 part tetra-n-butylammonium iodide, 71 parts 2-methyl-3-chloro-1,2-epoxypropane and 110 parts hexafluoroacetone was placed in a Hastelloy C lined shaker tube and heater at 120° C. for 12 hours. The reaction mixture was then distilled, giving 129.5 parts (71.7% yield) of 2,2-bis(trifluoromethyl)-4-methyl-4-chloromethyl-1,3-dioxolane, B.P. 64° C./145 mm., $n_D^{25}$ 1.3585.

*Analysis.*—Calcd. for $C_7H_7F_6O_2Cl$: C, 30.8; H, 2.6; F, 41.8; Cl, 13.0. Found: C, 30.6; H, 2.5; F, 42.6; Cl, 12.9.

Example 17

A mixture of 50 parts 1,3-dichlorotetrafluoroacetone, 23 parts epichlorohydrin (chloromethyl ethylene oxide), 0.5 part tetra-n-butylammonium iodide and 24 parts methanol was distilled slowly at atmospheric pressure giving 35.4 parts (48%) of 2,2 - bis(chlorodifluoromethyl) - 4-chloromethyl-1,3-dioxolane, B.P. 97–99° C./23 mm., $n_D^{25}$ 1.4160.

*Analysis.*—Calcd. for $C_6H_5Cl_3F_4O_2$: C, 24.7; H, 1.7; Cl, 36.6; F, 26.1. Found: C, 24.8; H, 1.8; Cl, 35.4; F, 26.1.

2,2-bis(chlorodifluoromethyl)-4-chloromethyl-1,3 - dioxolane gives 2,2-bis(chlorodifluoromethyl)-4-methylene-1,3-dioxolane when treated with strong base. This olefinic product is described by Simmons and Wiley, J. Amer. Chem. Soc., 82, 2288 (1960), prepared by a different route.

Example 18

A mixture of 80.5 parts 2,3,5,6-tetrachloro-2,3,5,6-tetrafluoro-1,4-cyclohexanedione, 0.5 part tetra-n-butylammonium iodide, 22 parts ethylene oxide (2 equivalents) and 0.1 part water was heated in a shaker tube at 120° C. for 12 hours. The reaction mass consisted of a very high boiling liquid and a solid (16 parts total). The product was shown to be a mixture of 1,4-dioxa-6,7,9,10-tetrachloro-6,7,9,10-tetrafluorospiro [4,5] decane-8-one (I) and 1,4,9,12-tetra-6,7,13,14-tetrachloro-6,7,13,14-tetrafluorodispiro [4,2,4,2] tetradecane (II). The solid was recrystallized and found to have a melting point of 241–242° C.

*Analysis.*—Calcd. for $C_{10}H_8F_4Cl_4O_4$: C, 29.3; H, 1.94; F, 18.6; Cl, 34.6; mole weight, 410. Found: C, 29.6; H, 1.9; F, 19.2; Cl, 33.5; mole weight, 411–415.

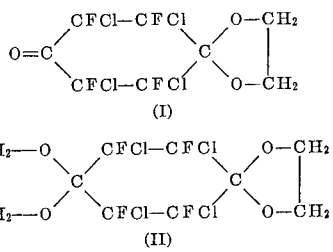

Example 19

A mixture of 58 parts methyl-10,11-expoxyundecanoate and 0.25 part lithium chloride was placed in a shaker tube. The tube was cooled to −50° C., evacuated and 45 parts hexafluoroacetone were added. The tube was sealed and heated at 110° C. for one hour, then 130° C. for 14 hours. After cooling, the product was discharged and distilled, giving 17 parts (12.1% yield) of 2,2-bis(trifluoromethyl)-4-(8'-carbomethoxyoctyl) - 1,3 - dioxolane, B.P. 113–113.5° C./0.3 mm.

*Analysis.*—Calcd. for $C_{15}H_{22}F_6O_4$: C, 47.4; H, 5.8; F, 30.0; mole weight 380. Found: C, 47.2; H, 5.7; F, 29.3; mole weight 379.

Example 20

A mixture of 0.5 part lithium chloride and 150 parts of "Fluorochemical FC–75", a commercial product believed to be a mixture of perfluorinated cyclic ethers one of which is perfluoro-n-butyloxolane, an inert solvent, was placed in a Hastelloy C shaker tube. The tube was sealed, cooled to −80° C. and evacuated. A mixture of 18.7 parts ethylene oxide and 0.2 part ethylene glycol was added to the tube followed by 93 parts 1,3-dichlorotetrafluoroacetone. The tube was then heated at 110° C. for one hour, then 120° C. for 10 hours with agitation. The pressure decreased from 140 p.s.i.g. to 20 p.s.i.g. Fractional distillation of the product gave 80 parts 2,2-bis(chlorodifluoromethyl)-1,3-dioxolane, B.P. 87° C./44 mm. (78% yield).

*Analysis.*—Calcd. for $C_5H_4Cl_2F_4O_2$: C, 24.7; H, 1.7; Cl, 29.2. Found: C, 25.0; H, 1.9; Cl, 29.3

Example 21

A mixture of 0.5 part lithium chloride and 0.2 part ethylene glycol was placed in a Hastelloy C shaker tube. The tube was cooled to −80° C., evacuated and 29.8 parts ethylene oxide and 110 parts hexafluoroacetone were added. The tube was sealed and heated at 110° C. for 1 hour, then 120° C. for 10 hours. After cooling the product was discharged and distilled giving 100.5 parts of 2,2-bis(trifluoromethyl)-1,3-dioxolane, B.P. 100–104.5° C. The over-all yield was 72%.

Example 22

A mixture of 0.5 part lithium chloride and 0.3 part ethylene glycol was placed in a shaker tube. The tube was cooled to −80° C., evacuated and 32 parts propylene oxide and 87 parts hexafluoroacetone were added. The tube was sealed and heated at 110° C. for one hour, then at 120° C. for 10 hours. After cooling, the product was discharged and distilled giving 91 parts (78%) of 2,2-bis(trifluoromethyl)-4-methyl-1,3-dioxolane, B.P. 43° C./44 mm.

*Analysis.*—Calcd. for $C_6H_6F_6O_2$: C, 32.2; H, 2.7. Found: C, 32.5; H, 3.0.

Example 23

A mixture of 0.5 part lithium chloride and 19 parts methanol was placed in a shaker tube. The tube was sealed, cooled to −80° C., evacuated and 34 parts propylene oxide and 98 parts hexafluoroacetone were added. The tube was sealed and heated for 3 hours at 100° C., then 120° C. for 9 hours. After cooling, the product was discharged and distilled, giving 93.1 parts (71% yield) 2,2-bis(trifluoromethyl)-4-methyl-1,3-dioxolane, B.P. 60–63° C./120 mm.

*Example 24*

A mixture of 21 parts methyl glycidate,

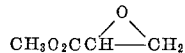

0.5 part tetra-n-butylammonium iodide, 0.1 part water and 34 parts hexafluoroacetone was placed in a shaker tube and heated at 120° C. for 10 hours. The product was discharged and distilled, giving 30 parts (55% yield) of 2,2-bis(trifluoromethyl)-4-carbomethoxy-1,3-dioxolane, B.P. 59° C./8 mm., $n_D^{25}$ 1.3496.

*Analysis.*—Calcd. for $C_7H_6F_6O_4$: C, 31.4; H, 2.26; F, 42.5. Found: C, 31.4; H, 2.1; F, 42.5.

The following examples are given for purposes of comparison and illustrate processes which are not within the scope of this invention.

*Example 25*

A mixture of lithium fluoride (0.5 part), hexafluoroacetone (110 parts), water (0.1 part), and ethylene oxide (29 parts) was heated in a shaker tube for more than 12 hours at 200° C. There was obtained a conversion of only 24%, of which 44.7% was 2,2-bis(trifluoromethyl)-1,3-dioxolane and 55.3% was polymer.

*Example 26*

A mixture of lithium sulfate (0.5 part), hexafluoroacetone (110 parts), water (0.1 part), and ethylene oxide (29 parts) was heated in a shaker tube at 120° C. for more than 12 hours. There was obtained a conversion of only 13% of which 59% was 2,2-bis(trifluoromethyl)-1,3-dioxolane and 41% was polymer.

*Example 27*

A mixture of sodium bifluoride (0.5 part), hexafluoroacetone (110 parts), water (0.1 part), and ethylene oxide (29 parts) was heated in a shaker tube at 120–195° C. With or without water present, there was obtained 13.9 parts of 2,2-bis(trifluoromethyl)-1,3-dioxolane (10% conversion) and 17 parts polymer (12.3% conversion).

*Example 28*

A mixture of stannic chloride (0.5 part), hexafluoroacetone (110 parts), water (0.1 part), and ethylene oxide (29 parts) was heated at 120° C. for greater than 12 hours. The only product found was a mixture of liquid and solid polymers (71 parts, 51% conversion).

*Example 29*

A mixture of tetra-n-butylammonium iodide (0.5 part), hexafluoroacetone (110 parts), water (0.1 part), and cyclohexene oxide (66 parts) was heated at 120° C. for 12 hours. The entire product was found to be a polymer (94 parts, 53.4% conversion).

*Example 30*

A mixture of tetra-n-butylammonium iodide (1 part), hexafluoroacetone (110 parts), water (0.1 part), and hexafluoropropylene oxide (166 parts) was heated at 150° C. for 12 hours. There was obtained only a polymeric product (10 parts, 33.2% conversion).

*Example 31*

A mixture of lithium bromide (0.5 part), cyclohexene oxide (49 parts), ethylene glycol (31 parts), and 1,3-dichlorotetrafluoroacetone (49 parts) was heated at 125° C. for 3 hours. Only polycyclohexene oxide was obtained.

*Example 32*

A mixture of tetra-n-butylammonium iodide (0.5 part), ethylene oxide (22 parts), water (0.1 part), and bis(perfluoroisopropyl)ketone (22 parts) was heated at 120° C. for 12 hours. No reaction occurred.

It will be understood that the foregoing Examples 1 to 24 have been given for illustrative purposes solely, and that this invention is not limited to the specific embodiments described therein. On the other hand, it will be readily apparent to those skilled in the art that, subject to the limitations set forth in the general description, many variations and modifications can be made in the materials, proportions and conditions employed without departing from the spirit and scope of this invention.

From the foregoing description and examples, it will be apparent that this invention provides a new and improved process for preparing 2,2-bis(polyfluoroalkyl)-1,3-dioxolanes. Particularly, it provides a process employing a novel class of catalysts for bringing about the desired reaction between a defined class of polyfluoroketones and a defined class of epoxides to produce the desired dioxolanes in high yields without the formation of undesired polymers. It permits the production of the desired type of dioxolanes from starting materials which could not be used in prior processes. Also, the process is simple, easy and economical to operate. Accordingly, it is obvious that this invention constitutes a valuable advance in and contribution to the art.

The embodiments of the invention in which an exclusive property or privilege is claimed are defined as follows:

1. The process for preparing a 2,2-bis(polyfluoroalkyl)-1,3-dioxolane which comprises reacting, at a temperature in the range of from about 21° C. to about 200° C.
    (a) a polyfluoro-ketone of 3 to 21 carbon atoms having the formula $R_xCXF$—CO—$CYFR_y$ wherein each of X and Y is a halogen atom of atomic numbers 9–17, and $R_x$ and $R_y$ is a member of the group consisting, separately, of F, Cl, perfluoroalkyl groups of 1–10 carbon atoms, and ω-hydroperfluoroalkyl groups of 1–10 carbon atoms, and, jointly, of polyfluoroalkylene and oxopolyfluoroalkylene groups of 1–3 carbon atoms which form with the —CXF—CO—CYF— group a carbocyclic ring of 4–6 carbon atoms;
    (b) with an epoxide selected from the group consisting of ethylene oxide, propylene oxide, styrene oxide, butadiene diepoxide, epichlorohydrin, 2-methyl-3-chloro-1,2 - epoxypropane, 1,4-dichloro - 2,3-epoxybutane, methyl 10,11-epoxyundecanoate, and methyl glycidate;
    (c) in the presence of a catalytic amount of a catalyst of the group consisting of lithium chloride, alkali metal halides in which the halogens are of atomic numbers 35–53, and quaternary ammonium halides in which the halogens are of atomic numbers 35–53 and the quaternary ammonium cations are selected from tetraalkylammonium and aralkyltrialkylammonium cations.

2. The process for preparing a 2,2-bis(polyfluoroalkyl)-1,3-dioxolane which comprises reacting, at a temperature in the range of from about 21° C. to about 200° C.,
    (a) a saturated perhalocarbon monoketone of 3 to 21 carbon atoms in which there are at least 2 halogen atoms on each α-carbon atom at least one of which is fluorine and in which at least 50% of all halogen atoms are fluorine and the rest are chlorine;
    (b) with an alkylene oxide of 2 to 20 carbon atoms and 1 to 2 epoxy groups in which the 2 carbon atoms of each epoxy group together carry at least 2 hydrogen atoms and each carbon atom of each epoxy group forms part of an acyclic carbon chain;
    (c) in the presence of a catalytic amount of a tetraalkylammonium halide in which the halogen is of atomic numbers 35–53.

3. The process for preparing a 2,2-bis(polyfluoroalkyl)-1,3-dioxolane which comprises reacting, at a temperature in the range of from about 21° C. to about 200° C.,
   (a) a saturated perhalocarbon monoketone of 3 to 8 carbon atoms in which there are at least 2 halogen atoms on each α-carbon atom at least one of which is fluorine and in which at least 50% of all halogen atoms are fluorine and the rest are chlorine;
   (b) with an alkylene oxide of 2 to 4 carbon atoms and 1 to 2 epoxy groups in which the 2 carbon atoms of each epoxy group together carry at least 2 hydrogen atoms and each carbon atom of each epoxy group forms part of an acyclic carbon chain;
   (c) in the presence of a catalytic amount of a tetraalkylammonium halide in which the halogen is of atomic numbers 35–53.

4. The process for preparing a 2,2-bis(polyfluoroalkyl)-1,3-dioxolane which comprises reacting, at a temperature in the range of from about 21° C. to about 200° C.,
   (a) a saturated perfluorocarbon monoketone of 3 to 8 carbon atoms in which there are at least 2 fluorine atoms on each α-carbon atom;
   (b) with an alkylene oxide of 2 to 4 carbon atoms and 1 to 2 epoxy groups in which the 2 carbon atoms of each epoxy group together carry at least 2 hydrogen atoms and each carbon atom of each epoxy group forms part of an acyclic carbon chain;
   (c) in the presence of a catalytic amount of a tetraalkylammonium halide in which the halogen is of atomic numbers 35–53.

5. The process for preparing a 2,2-bis(polyfluoroalkyl)-1,3-dioxolane which comprises reacting, at a temperature in the range of from about 21° C. to about 200° C.,
   (a) a saturated ω-hydroperhalocarbon monoketone of 3 to 21 carbon atoms in which there are at least 2 halogen atoms on each α-carbon atom at least one of which is fluorine and in which at least 50% of all halogen atoms are fluorine and the rest are chlorine;
   (b) with an alkylene oxide of 2 to 20 carbon atoms and 1 to 2 epoxy groups in which the 2 carbon atoms of each epoxy group together carry at least 2 hydrogen atoms and each carbon atom of each epoxy group forms part of an acyclic carbon chain;
   (c) in the presence of a catalytic amount of a tetraalkylammonium halide in which the halogen is of atomic numbers 35–53.

6. The process for preparing a 2,2-bis(polyfluoroalkyl)-1,3-dioxolane which comprises reacting, at a temperature in the range of from about 21° C. to about 200° C.,
   (a) a saturated ω-hydroperfluorocarbon monoketone of 3 to 8 carbon atoms in which there are at least 2 fluorine atoms on each α-carbon atom;
   (b) with an alkylene oxide of 2 to 4 carbon atoms and 1 to 2 epoxy groups in which the 2 carbon atoms of each epoxy group together carry at least 2 hydrogen atoms and each carbon atom of each epoxy group forms part of an acyclic carbon chain;
   (c) in the presence of a catalytic amount of a tetraalkylammonium halide in which the halogen is of atomic numbers 35–53.

7. The process for preparing a 2,2-bis(polyfluoroalkyl)-1,3-dioxolane which comprises reacting, at a temperature in the range of from about 21° C. to about 200° C.,
   (a) a saturated perhalocarbon monoketone of 3 to 21 carbon atoms in which there are at least 2 halogen atoms on each α-carbon atom at least one of which is fluorine and in which at least 50% of all halogen atoms are fluorine and the rest are chlorine;
   (b) with a substituted alkylene oxide of 2 to 20 carbon atoms and 1 to 2 epoxy groups in which the 2 carbon atoms of each epoxy group together carry at least 2 hydrogen atoms and each carbon atom of each epoxy group forms part of an acyclic carbon chain, and the substituents consist of 1 to 2 haloalkyl groups;
   (c) in the presence of a catalyst amount of a tetraalkylammonium halide in which the halogen is of atomic numbers 35–53.

8. The process for preparing a 2,2-bis(polyfluoroalkyl)-1,3-dioxolane which comprises reacting, at a temperature in the range of from about 21° C. to about 200° C.,
   (a) a saturated perhalocarbon monoketone of 3 to 21 carbon atoms in which there are at least 2 halogen atoms on each α-carbon atom at least one of which is fluorine and in which at least 50% of all halogen atoms are fluorine and the rest are chlorine;
   (b) with a substituted alkylene oxide of 2 to 20 carbon atoms and 1 to 2 epoxy groups in which the 2 carbon atoms of each epoxy group together carry at least 2 hydrogen atoms and each carbon atom of each epoxy group forms part of an acyclic carbon chain, and the substituents consist of 1 to 2 chloromethyl groups;
   (c) in the presence of a catalytic amount of a tetraalkylammonium halide in which the halogen is of atomic numbers 35–53.

9. The process for preparing a 2,2-bis(polyfluoroalkyl)-1,3-dioxolane which comprises reacting, at a temperature in the range of from about 21° C. to about 200° C.,
   (a) a saturated perhalocarbon monoketone of 3 to 21 carbon atoms in which there are at least 2 halogen atoms on each α-carbon atom at least one of which is fluorine and in which at least 50% of all halogen atoms are fluorine and the rest are chlorine;
   (b) with an alkylene oxide of 2 to 20 carbon atoms and 1 to 2 epoxy groups in which the 2 carbon atoms of each epoxy group together carry at least 2 hydrogen atoms and each carbon atom of each epoxy group forms part of an acyclic carbon chain;
   (c) in the presence of a catalytic amount of an aralkyltrialkylammonium halide in which the halogen is of atomic numbers 35–53.

10. The process for preparing a 2,2-bis(polyfluoroalkyl-1,3-dioxolane which comprises reacting, at a temperature in the range of from about 21° C. to about 200° C.,
    (a) a saturated perfluorocarbon monoketone of 3 to 8 carbon atoms in which there are at least 2 fluorine atoms on each α-carbon atom;
    (b) with an alkylene oxide of 2 to 4 carbon atoms and 1 to 2 epoxy groups in which the 2 carbon atoms of each epoxy group together carry at least 2 hydrogen atoms and each carbon atom of each epoxy group forms part of an acyclic carbon chain;
    (c) in the presence of a catalytic amount of an aralkyltrialkylammonium halide in which the halogen is of atomic numbers 35–53.

11. The process for preparing a 2,2-bis(polyfluoroalkyl)-1,3-dioxolane which comprises reacting, at a temperature in the range of from about 21° C. to about 200° C.,
    (a) a saturated ω-hydroperfluorocarbon monoketone of 3 to 8 carbon atoms in which there are at least 2 fluorine atoms in each α-carbon atom;
    (b) with an alkylene oxide of 2 to 4 carbon atoms and 1 to 2 epoxy groups in which the 2 carbon atoms of each epoxy group together carry at least 2 hydrogen atoms and each carbon atom of each epoxy group forms part of an acyclic carbon chain;
    (c) in the presence of a catalytic amount of an aralkyltrialkylammonium halide in which the halogen is of atomic numbers 35–53.

12. The process for preparing a 2,2-bis(polyfluoroalkyl)-1,3-dioxolane which comprises reacting, at a temperature in the range of from about 21° C. to about 200° C.,
    (a) a saturated perhalocarbon monoketone of 3 to 21 carbon atoms in which there are at least 2 halogen atoms on each α-carbon atom at least one of which is fluorine and in which at least 50% of all halogen atoms are fluorine and the rest are chlorine;

(b) with a substituted alkylene oxide of 2 to 20 carbon atoms and 1 to 2 epoxy groups in which the 2 carbon atoms of each epoxy group together carry at least 2 hydrogen atoms and each carbon atom of each epoxy group forms part of an acyclic carbon chain, and the substituents consist of 1 to 2 haloalkyl groups;

(c) in the presence of a catalytic amount of an aralkyltrialkylammonium halide in which the halogen is of atomic numbers 35–53.

13. The process for preparing 2,2-bis(trifluoromethyl)-1,3-dioxolane which comprises reacting, at a temperature of from about 21° C. to about 130° C., (a) hexafluoroacetone
(b) with ethylene oxide;
(c) in the presence of a catalytic amount of a tetraalkylammonium halide in which the halogen is of atomic numbers 35–53.

14. The process for preparing 2,2-bis(chlorodifluoromethyl)-1,3-dioxolane which comprises reacting, at a temperature of from about 21° C. to about 130° C., (a) 1,3-dichlorotetrafluoroacetone
(b) with ethylene oxide;
(c) in the presence of a catalytic amount of lithium chloride.

15. The process for preparing 2,2-bis(trifluoromethyl)-4,5-bis(chloromethyl)-1,3-dioxolane which comprises reacting, at a temperature of from about 21° C. to about 130° C., (a) hexafluoroacetone
(b) with 1,4-dichloro-2,3-epoxybutane;
(c) in the presence of a catalyst amount of a tetraalkylammonium halide in which the halogen is of atomic numbers 35–53
(d) and, for each part of the catalyst (c), about 0.2 to about 1 part by weight of water.

No references cited.

ALEX MAZEL, *Primary Examiner.*
JAMES H. TURNIPSEED, *Assistant Examiner.*